United States Patent Office 3,519,591
Patented July 7, 1970

3,519,591
PROCESS FOR TREATING FILLERS
Justin C. Bolger, Needham, Mass., assignor to Amicon Corporation, Lexington, Mass., a corporation of Massachusetts
No Drawing. Filed Dec. 1, 1967, Ser. No. 687,147
Int. Cl. C08g *51/10;* C08k *1/14*
U.S. Cl. 260—37                                    10 Claims

ABSTRACT OF THE DISCLOSURE

Chrysotile asbestos is dispersed in water at a reduced pH and chemically bonded to a functional, cationic organic compound such as those exhibiting a pH of above 4 and a solubility in water of less than about 10% to improve its dispersibility and flow-modifying character in diverse chemical systems. The novel treated-asbestos products of this method and the novel compositions formed of these novel treated asbestos products are also subjects of the instant invention. Among such compositions are thixotropic epoxy-based pastes, polyester compositions, and polyvinyl chloride plastisols.

BACKGROUND OF THE INVENTION

Asbestos is a widely available and relatively inexpensive material having certain desirable physical properties which make it very useful as a filler in various chemical compositions. However, in order to achieve maximum effectiveness of the asbestos in improving properties of chemical compositions, it is necessary to reduce it to the form of primary fibrils. Moreover, even when the asbestos is dispersed into primary fibrils, it is often difficult to disperse it further into a plastic matrix, a plastisol, or the like without a further chemical pre-treatment.

Chrysotile asbestos mineral normally exists in nature in the form of fiber bundles. It is normally difficult to disperse such fiber bundles into the primary asbestos fibrils which are normally ca. .02 to .03$\mu$ in dameter and 1 to 100$\mu$ in length. Such primary fibrils are actually hollow tubules which consist of alternating concentric layers of tetrahedrally-coordinated silica and octahedrally-coordinated magnesium jointed into a three-dimensional lattice with the tips of the silica tetrahedra and one of the surfaces of the octahedryl layer lying in a common plane. The silica layer is in the oxide form. The magnesium layer is in an hydroxide form giving this layer a resemblance to the mineral brucite ($MgOH_2$).

Normally, the outermost layer of the primary fibril is a brucite type of layer causing chrysotile asbestos to have most of the surface properties of magnesium hydroxide. Thus, the iso-electric point of chrysotile asbestos is at a pH of about 11, and chrysotile is a cationic particle which tends to absorb anionic ions and surfactants. For this reason, most previous efforts reported in the literature to disperse or to surface treat chrysotile asbestos have involved a treatment with anionic surface active agents. For the same reason, chrysotile asbestos does not normally, absorb or bind, cationic surface-active agents such as organic amines.

A particular chrysotile asbestos material preferred in the present invention is obtained from a deposit located near Coalinga, Calif. This is a newly found deposit believed to be the largest single asbestos deposit in the world. Asbestos mined at this location is short fibered chrysotile asbestos and would be classified between grade 5 and grade 7 according to the Canadian Standards Classification. Coalinga asbestos, however, has a much more uniform distribution of individual fiber lengths and diameters than do comparable grades of Canadian chrysotile asbestos. In addition, the surface area of Coalinga asbestos is substantially greater than that type of asbestos. Refined asbestos obtained from the Coalinga deposit has properties which are substantially different from any prior art asbestos. While not wishing to be limited to the geographic deposit at Coalinga, Calif., the type of asbestos recovered from ore such as found there is preferred in the present invention.

SUMMARY OF THE INVENTION

Thus, it is an object of the instant invention to provide a process for reacting cationic organic radicals, amines having pK of above 4 and water solubility of less than 10%, with chrysotile asbestors and thereby forming a unique material useful in chemical compounding.

It is a further object of the invention to provide novel asbestos products formed by the reaction of cationic organic compounds and asbestos.

It is a further object of the invention to provide asbestos-filled polymeric compositions of improved flow properties, especially highly thixotropic properties.

Other objects of the invention will be apparent to those skilled in the art on reading the instant specification.

The above objects have been substantially achieved by a process comprising (1) the disperson of chrysotile asbestos in an aqueous medium at a pH below about 4.8 but preferably not below about 4.0 in order to avoid undesirably severe chemical attack on the asbestos.

(2) adding to this dispersion a cationic organic compound, thereby replacing magnesium ions at the outer surface of the asbestos fibrils with an organic radical.

The process described herein involves a step believed to be an exchange of a cationic organic compound, preferably an aliphatic amine of the type described, replacing magnesium ions at the outer surface of the fibrils. Schematically, this exchange can be written as:

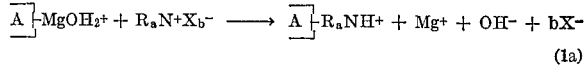
(1a)

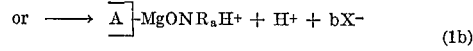
(1b)

where A represents the asbestos surface, where —MgOH represents magnesium hydroxide surface groups on the asbestos, and $R_aNX_b$ represents the mono-basic acid salt of a primary, secondary, or tertiary aliphatic amine; $a$ and $b$ are integers from 1 to 3 which integers taken together equal 4.

The cationic organic compound should, preferably, be only sparingly soluble in water in order to assure the operation and control of the process. By sparing solubility is meant solubility to not more than about 10% in water at 25° C. Particularly advantageous are amines having functional groups which are selected for promoting the compatibility or reactivity of the treated asbestos with the particular system into which it is to be incorporated.

Among some of the specific amines which are useful in the process of the invention are amines having ethylenically unsaturated polymerizable sites such as illustrated by these acrylate, vinyl and methacrylate compounds: tertiary butyl amino ethyl methacrylate, 2-methyl, 5-vinyl pyridine, 2-vinyl pyridine, 4-vinyl pyridine, aminomethyl acrylate, aminomethyl methacrylate, dimethylaminoethyl methacrylate, triallyl amine tetraallyl methylene diamine and diallyl melamine. Other useful and reactive amino compounds include 2-ethyl, 4-methyl imidazole and other such alkyl-substituted imidazole including for example, 2-methyl imidazole; 4,5-dimethylimidazole; 2,4,5-trimethylimidazole; 2-propyl, 4,5-dimethylimidazole and the like.

In general the quantity of amine put on the asbestos is from 1 to 20%. Amine treatments of from 2 to 20% are most advantageous.

Adequate dispersion of the chrysotile asbestos for subsequent reaction is achieved by high-shear agitation technique known to the art.

Particularly effective dispersions may be obtained by use of a process disclosed in co-pending and commonly-owned U.S. patent application, Ser. No. 681,933 filed Nov. 9, 1967 by Alan S. Michaels and entitled Coated Asbestos and Method of Making and Using Same. In this process, chrysotile asbestos is dispersed at a pH of about 4 to 5, and then reacted with a metallic ion such as barium. A dispersion so-formed is entirely adequate, and may often be a particularly advantageous, method for forming a dispersion of asbestos for use in the instant invention. However, it should be realized that the reaction with a metal ion causes a considerable amount of the magnesium on the asbestos surface to be replaced with the metal ion and, consequently, the organic cation to be reacted with the asbestos will be replacing a large amount of barium or other metal ion rather than magnesium as would have otherwise been the case.

The particular sequence in which the various reactants are added during the process of the invention is not critical excepting that the asbestos must first undergo a dispersing step before the cationic organic compound, e.g. amine or amine salt, is reacted with the asbestos material. For example, acid must first be added to drop the pH of the asbestos slurry between about 4.0 to 5.0, most advantageously between 4.2 and 4.8 before the addition of the salt.

Another important aspect of the instant invention is the discovery that the addition of a small quantity of base, advantageously $NH_4OH$, can aid in driving significant quantities of residual sparingly solubilized amine out of solution and onto the asbestos surface. This discovery allows greatly improved efficiency in amine utilization and broadens the number of amines which may be advantageously used in the process of the invention.

ILLUSTRATIVE EXAMPLES OF THE INVENTION

The following examples are presented to illustrate the process of the invention and the products produced thereby. They are not to be construed as limiting the scope of the invention; various modifications in processing conditions and reactants can be made, as will be obvious to those skilled in the art on reading the instant specification, in accordance with particular needs of various chemical compounders.

Example 1

Six grams of Coalinga asbestos, the colloid grade of high purity refined chrysotile asbestos available from Union Carbide Corporation, was slurred in 300 ml. of water. The pH was reduced to 4.2 by the addition of hydrochloric acid. Thereupon, the acidified slurry was agitated intensively in a Waring Blendor for five minutes after which the asbestos appeared to be well dispersed.

The dispersion was allowed to stand for about one hour to allow the settling of any grit or non-dispersable particles. During this time, a solid sediment formed at the bottom of the container. The asbestos dispersion above this sediment was decanted off and adjusted to a pH of 2.5 with hydrochloric acid. This pH slowly rose to about 2.8; the rise suggested that acid was causing magnesium to be leached away from the outer layer of the fibers and to become solubilized.

A reflocculation of the fibers took place at this low pH, however, it made little or no significant difference whether the fibers were filtered and re-suspended in water before the addition of the cationic organic reactant.

In the instant example, the flocculated suspension was agitated while 20 drops of tertiary butyl amino ethyl methacrylate were added thereto. This addition brought the pH up from about 2.8 to 5.0. One additional drop of the amine brought the pH to 8.0. At this point the fibers were filtered, washed and dried at 80° C. for 4 hours.

The resultant asbestos fibers filtered very rapidly and dried to a very soft-textured, oil-wettable, hydrophobic powder.

Example 2

Another six grams of the same Coalinga asbestos was dispersed, as described in Example 1. Enough $Ba(OH)_2$ was added to the dispersion to bring the pH to about 11. As judged by observation of the suspension in the dark field of an optical microscope, the use of $Ba(OH)_2$ results in an improved dispersion of the asbestos fibrils after subsequent pH adjustment; but this improvement is not necessary for most uses to which the instant invention is likely to be applied.

Acetic acid was then added slowly to drop the pH to about 4.4. Thereupon 0.6 gram of the acetate salt of tertiary butyl amino ethyl methacrylate was added to the asbestos slurry.

The asbestos reflocculated at this point. The flocculated asbestos was filtered, washed to remove any excess electrolyte and dried as indicated above.

Example 3

The procedure of Example 2 was repeated substituting as the acetate salt, the acetate salt of 2-methyl 5-vinyl pyridine.

Example 4

The procedure of Example 2 was again repeated excepting that the hydrochloride salt of 2-ethyl, 4-methyl imidazole was reacted with the asbestos instead of the acetate salt designated in Example 3.

Example 5

The utilization of a novel product of the invention as a gelling agent is described in this example. Performance is compared with (1) untreated asbestos of the type utilized as a raw material in the foregoing examples and (2) pyrogenic silica.

Ninety parts of the diglycidyl ether of Bisphenol A and ten parts of butylglycidyl ether were mixed to form an epoxy resin blend. Three 100-gram samples of this resin were prepared and each was mixed under high-shear conditions in a Cowles dissolver for five minutes with one of the following:

(A) Two parts of the asbestos-treated according to Example 1.
(B) Two parts of the untreated asbestos control.
(C) Two parts of colloidal pyrogenic silica sold under the trade name Cab-O-Sil plus 0.3 part of glycerine.

Viscosity of each of the resulting suspensions was measured with a No. 4 spindle on a Brookfield viscometer, Model LVT. The viscosity values were determined as follows:

VISCOSITY (Cps. $\times 10^{-3}$)

| Spindle, r.p.m. | Treated asbestos | Control asbestos | Pyrogenic silica and glycerine |
|---|---|---|---|
| 1.5 | 204 | 12.0 | 134 |
| 3.0 | 107 | 8.0 | 83 |
| 6.0 | 59 | 4.8 | 49 |
| 12.0 | 35 | 3.0 | 30 |
| 30.0 | 19 | 1.4 | 16 |
| 60.0 | 12 | 1.0 | 11 |

The data disclosed in the above table clearly show that asbestos treated according to the invention imparts a high degree of shear-thinning to the epoxy resin and thereby provides a dispersion which is highly gelled at low shear rates but is fluid at high shear rates. The untreated asbestos has very little gelling effect. Even pyrogenic silica, an expensive commercially-useful thickener is considerably inferior to the asbestos treated according to the instant invention.

Although it is well known that tertiary amines such as tertiary butylaminoethylmethacrylate can cause gelation or cure of epoxy resins in homogeneous solutions, the treated asbestos samples described above showed no tendency to gel or thicken upon long standing. Even after 12 months, these dispersions remained fluid and essentially unchanged in viscosity. This indicated that the tertiary amine groups are chemically attached to the asbestos surface, and hence are unavailable for reaction with the epoxy resin.

Comparisons of the two asbestos-epoxy suspensions carried out (a) with the unaided eye and (b) with a 400×, dark-field, microscope shows the dispersion of the treated asbestos formulation to be a clear, transparent gel. Substantially no fiber bundles were visible with the microscope.

In contrast, the untreated asbestos tends to settle out of the epoxy resin on standing, gives a poorly dispersed mixture and shows a high proportion of coarse fiber bundles in the microscope.

The epoxy formulated with our treated resins does not sag or drip when applied to vertical surfaces in films up to, for example, 80 mils thick.

Example 6

Two parts of the treated asbestos of Example 5 were dispersed into 100 parts of a styrenated polyester resin sold by the Kopper's Corporation under the trade designation Koplac 1070–5. The Brookfield viscosity measurements showed excellent gelation and shear thinning; i.e., a viscosity of 128,000 cps. at 1.5 r.p.m. dropping to a value of 8,000 cps. at 60 r.p.m. In contrast the same resin thickened to the same initial viscosity, at 1.5 r.p.m., with 2% Cab-O-Sil and 0.4% glycerine. This latter material does not shear thin to any appreciable extent, but has a viscosity off the viscometer scale at all speeds above 3.0 r.p.m.

Example 7

In a separate series of experiments, four parts of the treated asbestos (of Example 2) were blended into 100 parts of the same styrenated polyester resin disclosed in Example 6 by first mixing for 5 minutes in a Cowles dissolver and then passing twice through a 3-roll mill to remove air bubbles. One percent (1%) MEK peroxide, a polymerization catalyst, was added to a portion of this suspension during the final pass through the roll mill. The resultant mixture was poured into dog-bone molds and allowed to cure overnight at room temperature. Separately, 1% MEK peroxide was added to an unfilled sample of this polyester resin and the resultant mixture was poured into an identical mold and cured for the same period.

In still another sample, the resin was modified by adding 2% Cab-O-Sil and 0.4% glycerine thereto, by the same dispersion and milling procedure, and by curing with the same MEK catalyst.

After 24 hours, samples were tested on an Instron tensile tester at a gauge length of one inch. The polyester containing the treated fibers showed a significant improvement in physical properties as shown in the table below:

| Filler | Tensile Strength (p.s.i.) | Elongation, percent at Failure | Tangent Modulus p.s.i. |
|---|---|---|---|
| Unfilled Resin | 3,840 | 2.5 | 130,000 |
| 4% Treated Asbestos | 5,800 | 5.6 | 160,000 |
| 2% Cab-O-Sil/0.4% glycerine | 1,910 | 3.6 | 114,000 |

The following example is presented to allow use of the instant process in forming novel reinforced polyolefin-based compositions.

Example 8

Ten parts of the treated asbestos prepared as in Example 3, were dry-mixed, in a Waring Blendor, with 0.4 part of ethylene glycol diacrylate, and 0.1 part of a peroxide catalyst sold under the trade designation L–130 by Lupersol Co. To this mixture was added 40 parts of high density polyethylene powder (reactor flake, sold under the trade designation 6560 by Koppers Corporation). The dry blend was fluxed 10 minutes in a Brabender roller head mixer at a melt temperature of 160° C. As a control sample, the procedure described in the co-pending application, Ser. No. 533,238, filed Mar. 10, 1966 by Bixler and Fallick was followed. Untreated asbestos was used in place of asbestos treated according to the instant invention. A quantity of 2-methyl vinyl pyridine equal to that present was used on the surface of the treated asbestos, along with catalyst and ethylene glycol diacrylate. Tensile bars were injection-molded from both batches were conditioned for 16 hours in a constant temperature room at 75° F. before testing. Tensile properties are shown below:

|  | Untreated asbestos | Treated asbestos |
|---|---|---|
| Melt Index | 1.75 | 2.20 |
| Tangent Modulus | 233,000 | 219,000 |
| Elongation at— |  |  |
| Yield, percent | 8.6 | 10 |
| Fail, percent | 15 | 22 |
| Tensile Strength at— |  |  |
| Yield | 4,330 | 5,420 |
| Fail | 3,940 | 4,950 |
| Izod Impact, Ft.-lb./in. | 0.5 | 0.9 |

It is seen that asbestos treated according to the instant invention gives a significant improvement in elongation, tensile at yield, strength at failure, and in Izod impact. The melt index is also considerably higher for the pretreated asbestos, again suggesting an improvement in degree of dispersion.

Example 9

In a separate series of tests, three vinyl plastisols were prepared according to the following formulations

|  | Parts by Weight | | |
|---|---|---|---|
| Formulae | A | B | C |
| PVC Homopolymer (Goodrich's GEON 121) | 100 | 100 | 100 |
| Dioctyl phthalate | 40 | 40 | 40 |
| Triethylene glycol dimethacrylate | 20 | 20 | 20 |
| L–130 Peroxide catalyst | 0.2 | 0.2 | 0.2 |
| Ferro 1720 Stabilizer | 0.4 | 0.4 | 0.4 |
| Asbestos treated via Example 2 |  | 30 |  |
| Untreated Asbestoes |  |  | 28 |
| Tert-butyl amino ethyl methacrylate |  |  | 2 |

Formula A contains no asbestos. Formula B contains the asbestos prepared according to Example 2, while Formula C contains a simple blend of untreated asbestos plus tertiary-butyl aminoethylmethacrylate. Films were fabricated by each of two procedures:

*Procedure I.*—Ethanol was added to the plastisol pastes to reduce the viscosity and the pastes were then drawn down in six mil films on ferro-type plates. After permitting the ethanol to evaporate, the films were then fused for six minutes at 160° C.

*Procedure II.*—No solvent was added—rather the pastes were first drawn down in six mil films, partially cured for 3 minutes at 160° C., and then hot pressed for 3 additional minutes at 160 to consolidate the films.

The tensile and elongation results of the film samples after cure and removal from the plates are shown below:

Solvent-thinned samples

|  | Tensile at Failure, p.s.i. | Percent Elongations |
|---|---|---|
| Procedure I: |  |  |
| Unfilled Formula A | 1,180 | 115 |
| Formula B (Treated Asbestos) | 1,850 | 40 |
| Formula C (Untreated Asbestos) | 1,210 | 50 |
| Procedure II: |  |  |
| Formula C (Untreated Asbestos) | 1,050 | 80 |
| Formula B (Treated Asbestos) | 2,900 | 200 |

Example 10

The process of Example 1 was repeated except that the pH was not dropped to 2.5 with hydrogen chloride and the pH was brought up only to 5.0 by adding of the tertiary butyl amino ethyl methacrylate. After reaching a pH of 5.0 the pH was brought up to 8.5 by the addition of ammonium hydroxide to the slurry. The repeated experiments indicated that the amount of unsaturated amine could be reduced by at least 25% without any harmful effect on the treated asbestos when the ammonium hydroxide was used as indicated in this example.

It appears, therefore, that the present process has three major advantages:

(A) This process is considerably simpler, more economical, and easier to control than other processes described in previous disclosures involving dispersion techniques in organic media, or attachment of reactive groups by vinyl polymerization at the asbestos surface.

(B) By proper selection of the amine surfactant used; i.e., by tailoring the polarity and chemical composition of the amine to match the ultimate polymer, it is possible to make oil wettable asbestos which disperses rapidly and completely in low viscosity resins, such as epoxies, polyesters, etc., giving clear transparent gels of desirable rheological characteristics.

(C) By selecting an amine having a vinyl, acrylate, methacrylate or other unsaturated group, it is possible to cause this group to react with vinyl groups in the resin phase; e.g., with the diacrylates used in the vinyl and polyethylene formulations above, or with the styrenated polyester cited above to yield physical properties which are considerably improved over those attainable using untreated asbestos.

What is claimed is:

1. A process for forming an improved chrysotile asbestos material comprising the steps of
   (1) forming an aqueous dispersion of said asbestos at a pH between about 4 and about 5,
   (2) displacing metal atoms on the surface of said asbestos by reaction of said atoms with 1–20% by weight of imidazole or of ethylenically unsaturated polymerizable amines based on the weight of said asbestos, said amines having a pH of above about 4 and a water solubility of less than 10%, and
   (3) flocculating said dispersed asbestos.

2. A process as defined in claim 1 wherein said metal ions being displaced are barium or magnesium.

3. A process as defined in claim 1 comprising the additional step of reducing the solubility of said amines by adding a quantity of base to said dispersion.

4. A process as defined in claim 3 wherein said base is $NH_4OH$.

5. A composition of matter comprising finely dispersed chrysotile asbestos having chemically bonded to the surface thereof an imidazole or an ethylenically unsaturated polymerizable amine.

6. A composition as defined in claim 5 wherein said residual amino group is derived from a displacement reaction between a metal atom on the asbestos surface and an amine selected from the group consisting of amino methacrylates, vinyl pyridines and imidazoles.

7. A thixotropic composition comprising the dispersed asbestos product of claim 5 in a polyvinylchloride plastisol.

8. A thixotropic composition comprising the dispersed asbestos product of claim 5 in an epoxy resin paste.

9. A thixotropic composition comprising the dispersed asbestos product of claim 5 in a polyester-based coating.

10. A composition as defined in claim 5 wherein said composition comprises a major portion of a polyolefin.

References Cited

UNITED STATES PATENTS

| | | | |
|---|---|---|---|
| 2,282,006 | 5/1942 | Sloan | 106—308 |
| 2,356,542 | 8/1944 | Sloan | 117—126 |
| 3,014,810 | 12/1961 | Dybalski et al. | 106—308 |
| 3,156,574 | 11/1964 | Gomm et al. | 106—308 |
| 3,272,772 | 9/1966 | Russell | 106—308 |
| 3,304,197 | 2/1967 | Pundsack et al. | 117—126 |

FOREIGN PATENTS 630,418 10/1949 Great Britain.

OTHER REFERENCES

Modern Plastics Encyclopedia 1967 (September 1966), vol. 44, No. 1A, p. 589 relied upon.

Chemical Abstracts, vol. 67, 1967, par. 118028b.

MORRIS LIEBMAN, Primary Examiner

S. M. PERSON, Assistant Examiner

U.S. Cl. X.R.

106—308; 117—126; 260—40, 41